Dec. 29, 1931.  S. L. SCHIFF  1,838,501
ALTERNATING CURRENT CLOCK
Filed May 24, 1930
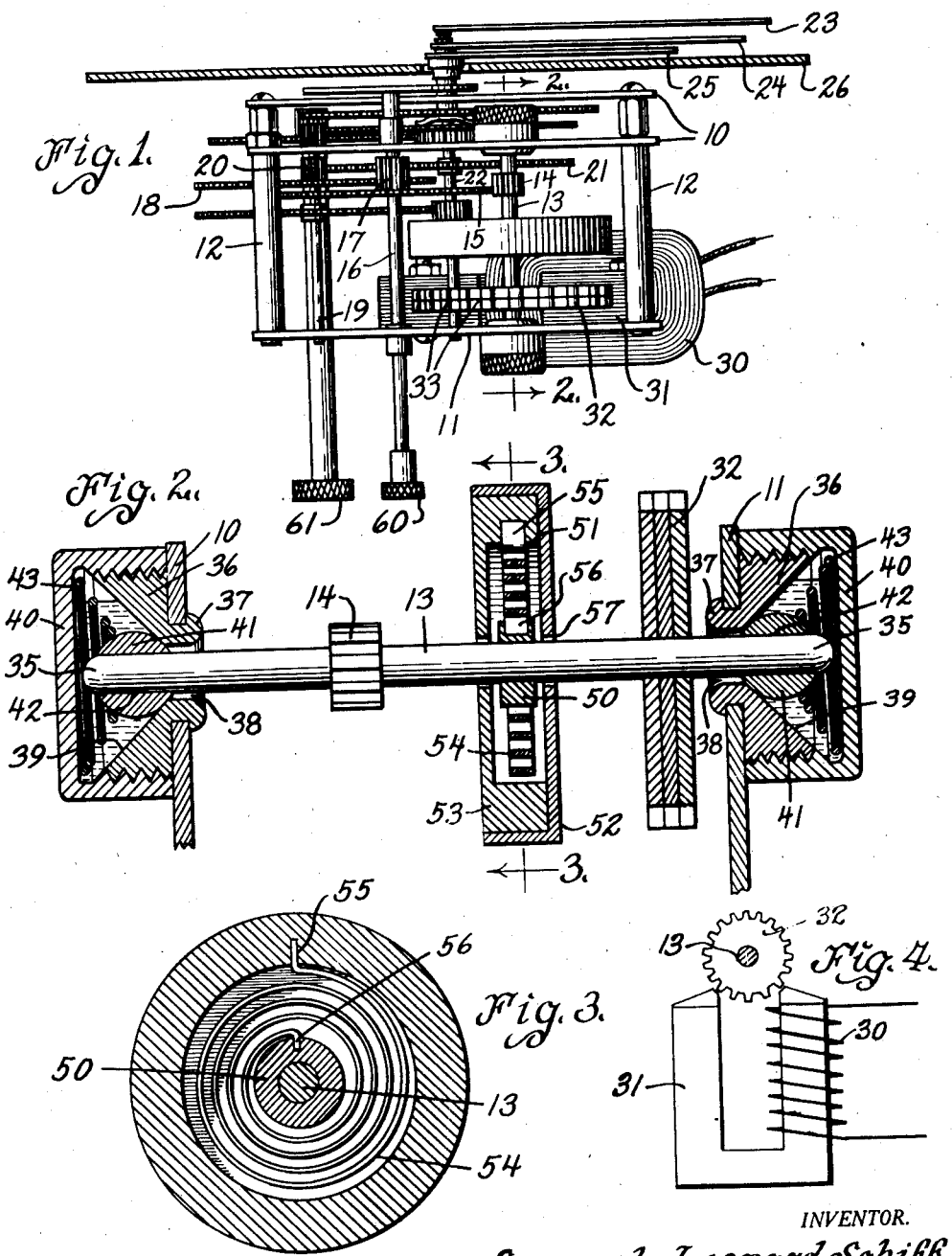
INVENTOR.
Samuel Leonard Schiff
BY
ATTORNEY.

Patented Dec. 29, 1931

1,838,501

UNITED STATES PATENT OFFICE

SAMUEL LEONARD SCHIFF, OF CHICAGO, ILLINOIS, ASSIGNOR TO ELECTRIC CLOCK CORPORATION OF AMERICA, OF CHICAGO, ILLINOIS, A CORPORATION OF ILLINOIS

ALTERNATING CURRENT CLOCK

Application filed May 24, 1930. Serial No. 455,171.

This invention relates to synchronous motor driven clocks of a type adapted to be operated directly by the alternating currents usually supplied for electric light and power service.

An object of the invention is to provide a synchronous motor driven clock of the character described which will be reliable, simple and economical in construction, less liable to be affected by variations in the current supply, and which will be highly efficient for carrying out the purpose for which it is designed.

Another object of the invention is to provide in an electric clock of the character described, an improved inertia member applicable to the rotor of the synchronous motor for driving said clock, said inertia member being mechanically and yieldably connected to said rotor for aiding in maintaining the rotor at synchronous speed.

A further object of this invention is to provide in an electric clock of the character described, an improved synchronous motor, having an improved mechanically connected inertia member, said inertia member having the potential energy thereof varying with the relative speed between the rotor and inertia member.

A still further object of the invention is to provide in an electric clock of the character described an improved synchronous motor, having an inertia member yieldably connected thereon, the means connecting said inertia member being sufficiently strong to enable the said inertia member to drive the clock mechanism and at the same time is sufficiently yieldable to permit slippage so that the said inertia member will not be capable of pulling the rotor out of step.

A still further object of the invention is to provide in an electric clock of the character described an improved synchronous motor having the ends of the rotor shaft thereof journalled within improved self-aligning bearings.

A still further object of the invention is to provide in an electric clock of the character described an improved synchronous motor having an inertia member loosely connected to the rotor of the motor by spiral spring means.

A still further object of the invention is to provide in an electric clock of the character described an improved synchronous motor having an improved construction of rotor.

With the foregoing and other objects in view, which will appear as the description proceeds, the invention consists in certain novel and improved features of construction, arrangement, and a combination of parts hereinafter more fully described, illustrated in the accompanying drawings, and particularly pointed out in the appended claims, it being understood that various changes in the form, and minor details of construction may be made without departing from the spirit or sacrificing any of the advantages of the invention.

Stated generally, the invention comprises an improved construction of synchronous motor adapted for use in driving a clock mechanism, said motor having the usual rotor shaft which in the improved construction has the ends thereof journalled in the novel and improved self-aligning bearings.

The said rotor shaft has rigidly secured thereon, for rotation therewith, a laminated magnetic rotor provided with a plurality of regularly spaced radial projections, which are so spaced that two non-adjacent projections may lie in substantial registry with the pole pieces of a substantial U-shaped core, about one leg of which is wound a coil. The rotor shaft has associated therewith my improved inertia member which consists of an annular hollow casing surrounding a spiral spring, one end of which spring is secured to said rotor shaft and the other end of which spring is secured to the inner surface of the annular outer wall of said casing. The side walls of said casing being provided with central openings through which the rotor shaft is adapted to extend loosely. The said spiral spring is of such a strength as to enable the inertia member to drive the clock mechanism and is at the same time sufficiently yieldable to permit slippage so that the said inertia member will not be capable of pulling the rotor out of step. Thus it will be noted that the spiral spring means coupling the inertia member to the rotor shaft will have potential energy built up therein to provide a highly efficient compensation for the acceleration and deceleration of the rotor.

For the purpose of facilitating an understanding of my invention, I have illustrated in the accompanying drawings a preferred embodiment thereof, from an inspection of which, when considered in connection with the following description, my invention, its mode of operation, construction, assembly and many of its advantages should be readily understood and appreciated.

Referring to the drawings, in which similar characters of reference are employed to indicate corresponding or similar parts throughout the several figures of the drawings:—

Figure 1 is a bottom plan view of a clock mechanism, embodying the invention, the dial of said clock mechanism being shown in section;

Figure 2 is an enlarged vertical sectional view taken on line 2—2 of Figure 1, showing particularly the rotor, the rotor inertia member and the improved self-aligning bearings for the rotor shaft; and Figure 3 is a vertical section through the inertia member taken on line 3—3 of Figure 2.

Figure 4 is a fragmentary detailed view showing the rotor and field pole pieces of the synchronous motor employed for driving the clock mechanism.

Referring to the drawings more specifically, by characters of reference, the numerals 10 and 11 designate the usual front and rear frames for the clock mechanism, said frames being held in spaced relation by the bolts 12. The clock mechanism is driven by a synchronous motor to be hereinafter more fully described, said motor having the shaft 13, upon which is rigidly secured the driving pinion 14. The pinion 14 meshes with a gear 15, rigidly mounted on a shaft 16; said shaft 16 also carries a pinion 17, which meshes with a gear 18 carried on a shaft 19. A pinion 20, rigidly secured to the gear 18, meshes with a gear 21, carried on a shaft 22, which is journalled in the frames 10 and 11, and at its forward end carries a second hand 23. The minute hand 24 and hour hand 25 are suitably driven through a train of gearing which derives its power from the shaft 22, as is well known in the art. The hands 23, 24 and 25 register with a suitable dial 26 which may be supported by the frame 10, or by the casing of the clock in any suitable and well known manner.

The motor for driving said clock mechanism comprises a coil 30, wound about one leg of a laminated substantial U-shaped core secured to the frame 11 in any well known manner. A plurality of the laminations of the core 31 project upwardly and form a pair of pole pieces, said pole pieces extending into close propinquity with the periphery of a laminated magnetic rotor 32. The rotor 32 is provided with a plurality of regularly spaced radial projections 33, which are so spaced that two non-adjacent projections may lie in substantial registry with the said pole pieces at one time. The construction so far described forms no part of the present invention, and for that reason it is not thought necessary to describe the same in more detail.

As best shown in Figure 2 of the drawings, the rotor shaft 13 of my improved synchronous motor is of substantially uniform diameter throughout its length, and has the ends 35 thereof journalled in my improved self-aligning bearings to be now described.

May improved bearings comprise the bearing members 36, which are provided with sidewardly extending bosses 37, which project into suitable apertures formed in the frames 10 and 11, and are riveted to the frames in any suitable and well known manner. The said bearing members 36 are provided with enlarged central openings 38, through which the ends of the shaft 13 are adapted to extend. On the inner side of said bearing members 36 is provided a cone shaped surface 39, said surface 39 being concentric with the said central opening 38, and is in communication therewith. Suitable cup-shaped oil reservoirs 40 are suitably secured, such as by threading or the like, to the bearing members 36. The central openings 38 within the bearing members are closed to prevent the escape of the oil from said reservoirs 40, by means of the ball members 41 resting against the conical surface 39, said ball members having longitudinal passages 42 extending therethrough for the passage of the end 35 of the shaft 13. A suitable helical spring 43 is disposed within the oil reservoir 40, one end of said spring bearing against the end wall of the oil reservoir 40, and the other end of said spring acting against the ball member 41, forcing the same against the conical side 39 in the bearing member 36. As shown in Figure 2, the ends 35 of the shaft 13 are rounded in order to minimize the friction should these ends come in contact with the end wall of the oil reservoir 40. It will thus be noted that I have provided improved self-aligning bearings for the rotor shaft of my improved synchronous motor.

The rotor 32 in my improved construction is made up of a plurality of sections, as clearly shown in the drawings, and is rigidly secured on the shaft 13. Intermediate the ends of said shaft 13 is secured a non-magnetic sleeve or hub 50, said hub being secured to said shaft so as to rotate therewith in any suitable and well known manner. The said sleeve 50 forms the hub for an annular hollow member 51, which may be formed in two portions 52 and 53, secured together in any well known suitable manner. The member 51 is hollow on the inside and is adapted to receive therein a spiral spring member 54, one end 55 of which spring member is rigidly secured to the inner surface of the end wall of the member 51, as shown in Figure 2, and the other end 56 of which spring member is rigidly secured to the hub 50. The portions 52 and 53 making up the hollow inertia member 51 are provided with central openings 57, which are somewhat larger in diameter than the rotor shaft 13, so as to prevent the said member 51 from engaging the shaft.

The shaft 16 at its rearward end has a suitable thumb nut 60, by which the clock may be manually started. The hands of the clock may be set by a suitable thumb nut 61, which is connected to the hands through the usual means.

As already explained, the spiral spring member 54 which yieldably connects the inertia member 51 to the rotor shaft 13 is of such a strength as to enable the said inertia member to drive the clock mechanism, and is at the same time sufficiently yieldable to permit slippage so that the inertia member will not be capable of pulling the rotor out of step.

As is well known in the art, the alternating current passing through the coil 30 produces a magnetic flux in the pole pieces and portions of the armature or rotor 32. This flux varies in density and direction in accordance with the current flow through the coil 30. The projections 33 on the periphery of the rotor 32 are successively attracted toward the stationary pole pieces during normal running at synchronous speed. As the operation of motors of this type is well known in the art, it is not thought necessary to explain the same further herein. This type of motor is not self starting and when it is not equipped with some form of inertia device, it is difficult to start.

When the motor, however, is equipped with the mechanically connected yieldable inertia member as above described, and the spiral spring 54 is made sufficiently strong to drive the clock mechanism, which is the torque of the load and it is only necessary in starting the motor to impart to it by manual means a speed or revolution greater than synchronous speed. The spring is of sufficient strength so that during this manual impulse, not only the rotor, but also the inertia member is caused to rotate at a speed greater than synchronism. When the motor now starts to slow up and approaches synchronous speed, it falls into step with a sudden motion in which slipping occurs between the rotor and inertia member, whereupon potential energy is built up in the said spring member, and this potential energy will compensate for the deceleration of the rotor.

It is to be noted that the potential energy stored up in said spring member is not constant, but increases with the difference in speed between the inertia member and the shaft, due to the fact that the said spiral spring tends to wind about itself as the inertia member moves relative to said shaft. Thus, upon a slight acceleration of the rotor, the energy stored up will be small, but as the acceleration of the rotor becomes greater, the potential energy stored up, and consequently the torque applied to the inertia member will be very much greater; and conversely, if the rotor tends to decelerate rapidly, the energy which will be stored up and then returned to the rotor shaft from the inertia member will be correspondingly very great, while for a slight deceleration of the rotor, the energy stored and then returned to the rotor from the inertia member will be correspondingly very slight. This type of yieldable connection between the rotor shaft and the inertia member is a substantial factor in making the clock of this invention so easy to start and making the rotor keep in step so perfectly.

Since the thumb piece 60 is geared to the rotor shaft so that slow rotation of the former will cause rapid rotation of the latter, a single twirl of the thumb piece will impart to the inertia member a speed of rotation sufficient so that the momentum of the inertia of the inertia member will be capable of driving the rotor and the load at a speed above synchronism.

It will thus be noted that I have provided an improved synchronous motor particularly adapted for driving clock mechanism of the none self-starting type, this being due primarily to an improved form of energy member which is yieldably connected to the rotor shaft, said yieldable connection consisting of a spirally wound flat spring which will permit movement of said inertia member relative to said rotor shaft.

It will also be noted that I have provided a novel and improved self aligning bearing for the ends of said rotor shaft.

The invention has been explained by illustrating and describing a certain specific embodiment thereof, but it will be readily understood by those skilled in the art that the invention may be embodied in other forms than shown and described. I, accordingly, do not wish to be restricted to the particular construction or application disclosed herein by way of example, for the purpose of setting forth my invention in accordance with the patent statutes.

It is believed that my invention, its mode of construction, and assembly, and many of its advantages should be readily understood from the foregoing without further description, and it will be manifest that while a preferred embodiment of the invention has been shown and described, for illustrative purposes, the structural details are, nevertheless, capable of wide variation within the purview of my invention as defined in the appended claims.

What I claim and desire to secure by Letters Patent of the United States is:

1. In an electric clock having a time gear train adapted to be driven directly from an alternating current source, a non self starting synchronous motor having a rotor, means actuated by a single manual operation for imparting to said rotor a speed greater than its synchronous speed, an inertia member rotatable relative to said rotor, and a spiral spring forming a yieldable driving connection between said member and said rotor, said spring connection having sufficient potential energy built up at the speeds which are attained so that said rotor will fall into step and continue operation at synchronous speed as it slows down from the greater speed at which it is manually launched.

2. In an alternating current time keeping device, having a gear train, the combination of a synchronous motor having a rotor for driving said train, a rotor shaft upon which said rotor is fixedly mounted, an annular hollow member yieldably mounted on said rotor shaft and rotatable relative thereto, the yieldable means for connecting said hollow member to said shaft comprising a spiral spring having one end thereof rigidly fixed to said shaft, and the other end thereof rigidly secured to the inner end wall of said hollow member, and means for imparting to said rotor a speed greater than its synchronous speed by a single manual operation.

In witness whereof, I affix my signature.

SAMUEL LEONARD SCHIFF.